May 14, 1940.  C. F. COATES  2,200,835

SPREADER PLATE

Filed Sept. 23, 1938

CHARLES F. COATES
Inventor

By *Herbert E. Smith*

Attorney

Patented May 14, 1940

2,200,835

UNITED STATES PATENT OFFICE 2,200,835

SPREADER PLATE

Charles F. Coates, Spokane, Wash.

Application September 23, 1938, Serial No. 231,373

3 Claims. (Cl. 56—249)

My present invention relates to a Spreader plate for attachment to a lawn mower of the type employing a revolving cutter reel that coacts with a bottom knife to shear or cut lawn grass. It is well known that the spiral construction of such revolving cutters has a tendency to throw the cuttings rearwardly at an angle to the transverse axis of the revolving cutter when the mower is in operation. Because of this fact, when a gardener is using a lawn mower and dropping the cuttings on the ground, they have a tendency to throw to the left side of the machine and, under certain conditions, to pile up upon uncut grass and when the mower is subsequently run through this uncut grass that is being borne down by cuttings an even cut is practically an impossibility.

Under such conditions when a grass catcher of the usual duck and steel bottom plate construction is used, it is well known that the cuttings or clippings tend to pile up in the left portion of the catcher area and necessitate the operator's spreading the clippings long before the capacity of the catcher has been reached. It is with these difficulties in mind that I have devised a spreader plate comprising the basis of the invention herein.

It is a principal object of my invention to provide a device that will effectively separate and spread a stream of clippings passing rearwardly from the lawn mower so as to attain an even distribution of such cuttings.

Another object of my invention has been the provision of spreader means for the purpose described which is characterized by its simplicity in manufacture and ease in attachment to a lawn mower.

A further object of my invention is to provide a sturdy, rugged device of the character described, having no moving or individual mechanical parts.

Other objects and advantages of the invention will be apparent during the course of the following description.

Figure 1:
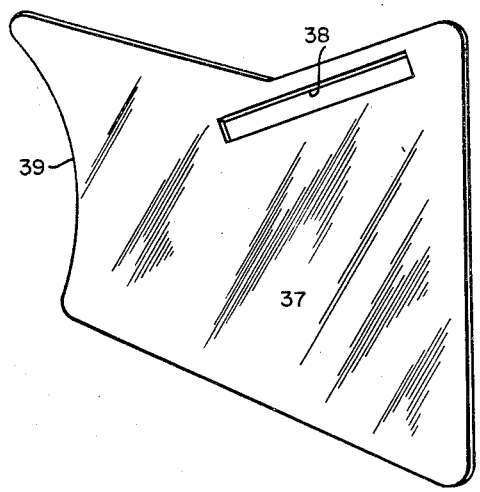
Figure 2:
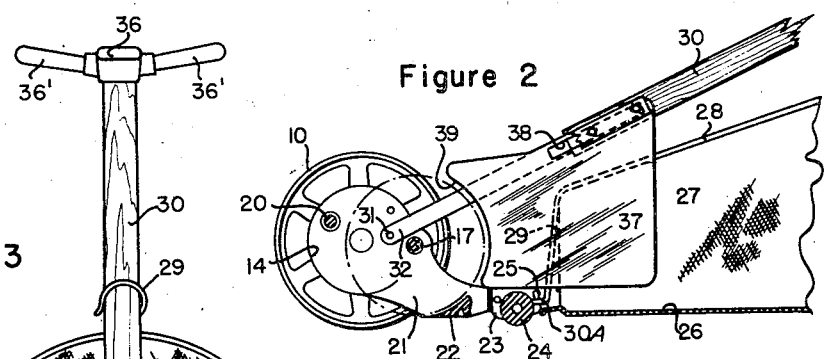
Figure 3:
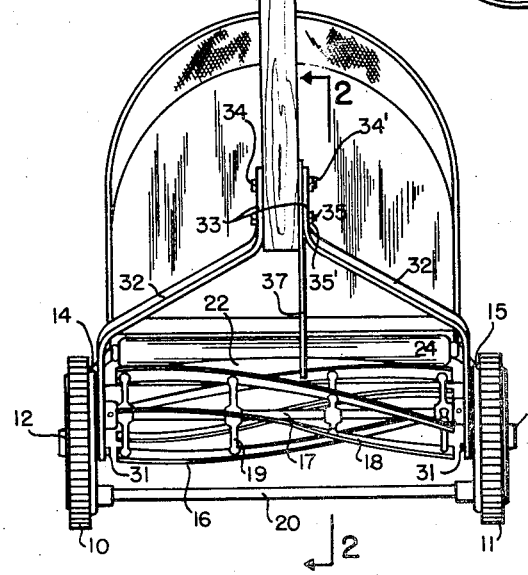

In the accompanying drawing, forming a part of this specification, and in which like numerals are employed to designate like parts throughout the same, Figure 1 is a perspective view of the spreader plate of my invention, Figure 2 is a vertical, sectional view of a lawn mower taken on lines 2—2 of Figure 3, and Figure 3 is a plan view of a lawn mower showing the device of my invention attached thereto.

Referring to Figure 3 where I show a lawn mower having the usual wheels 10 and 11 which are mounted upon stub axles 12 and 13 that are carried by means of the side frames 14 and 15. Frames 14 and 15 enclose the usual pinions and pawls (not shown) for the operation of a revolving cutter indicated as a whole by the numeral 16. The revolving cutter comprises an axle 17 and spirally curved knives 18 supported about the axle by means of spider heads 19. A tie rod 20 firmly connects the side frames 14 and 15 near their forward ends. The rear portion of the side frame, as may best be seen in Figure 2, is extended into a flange portion 21 upon which is carried the bottom knife 22. Upon roller hangers as 23 is supported a roller 24. Suitable hooks 25 are usually provided and attached to the roller hanger for supporting the grass catcher in place.

The grass catcher, illustrated herein, comprises a metal bottom 26 having a horseshoe shaped canvas wall 27 which is stiffened at its upper edge by means of a bail 28. A hook 29 engages the handle 30 of the mower substantially midway of its ends. Downwardly extending arms 29 having eyes 30A engage the hooks 25 to hold the catcher in proper relation to the mower.

Upon pivots 31, 31 are mounted handle bails 32 which have their upper ends shaped to form lugs 33. Bolts 34 and 35 secure the lugs of the handle bails 32 to the handle 30. The upper end of the handle 30 is provided with a cross head 36 and hand grips 36', 36'.

The spreader plate of Figure 1 is shown to comprise a body portion 37 roughly trapezoidal in shape, having in its upper portion an elongated slot 38. The length of the slot is considerably greater than the distance outside the bolts 34 and 35 and the width of the slot 38 is somewhat greater than the diameter of the bolts as 34 and 35. The forward or leading edge 39 of the plate is arcuate as may best be seen in Figure 1 to roughly conform to the circumference of the arc described by the revolving cutter 16. The attachment of my device to a lawn mower is effected by removing nuts 34' and 35' and disengaging the ends 33 of the bails 32 from the bolts. The bolts 34 and 35 are inserted into the slot 38 of he spreader plate and the bail ends 33 are re- replaced over the bolts and the nuts are then replaced and tightened.

By adjusting the plate through the agency of the slot 38 so that the forward arcuate edge 39 is spaced approximately one inch from the revolving cutter knives, the device is ready for operation. As the mower is run through grass and the knife throws the clippings rearwardly, the portion of clippings cut at the left hand end of the knives passes into the grass catcher or rearwardly in the usual manner.

Because of the fact that my spreader plate is mounted one-half the width of the handle off center to the left a greater portion of cuttings as they pass rearwardly, strike upon the baffle plate 37 and fall in the right hand portion of the grass catcher.

A similar action is true when no catcher is used. Through the use of the device herein, it is possible to fill a grass catcher basket to its fullest capacity or, in the absence of such grass catcher, to cut a lawn in subsequent backward and forward swaths, without piling clippings on uncut grass and thus produce an unevenly cut lawn.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus fully described my invention, what I claim as new and desire to secure by Letters Patent is:

1. In a lawn mower having a handle secured between bails, a spreader plate secured between said handle and one of said bails and depending downwardly therefrom and longitudinally of said handle, to thereby divide the stream of clippings discharged from the lawn mower.

2. In a lawn mower having a handle secured between bails and a grass catcher suspended from the handle, a spreader plate secured between said handle and one of said bails and depending downwardly therefrom and longitudinally of said handle and forming a central septum for the forward portion of the grass catcher, to thereby divide the stream of clippings discharged from the lawn mower.

3. In a lawn mower having a handle secured between bails and a grass catcher suspended from the handle, an obliquely slotted spreader plate secured between said handle and one of said bails and depending downwardly therefrom and longitudinally of said handle and movable in the direction of the oblique slot for raising and lowering said spreader plate with relation to said grass catcher.

CHARLES F. COATES.